(12) United States Patent
Langer et al.

(10) Patent No.: US 12,322,521 B2
(45) Date of Patent: Jun. 3, 2025

(54) MULTI-DIMENSIONAL ATOMIC OBJECT CONFINEMENT APPARATUS

(71) Applicant: Quantinuum LLC, Broomfield, CO (US)

(72) Inventors: Christopher Langer, Highlands Ranch, CO (US); Curtis Volin, Marietta, GA (US)

(73) Assignee: Quantinuum LLC, Broomfield, CO (US)

( * ) Notice: Subject to any disclaimer, the term of this patent is extended or adjusted under 35 U.S.C. 154(b) by 0 days.

(21) Appl. No.: 18/461,889

(22) Filed: Sep. 6, 2023

(65) Prior Publication Data

US 2023/0420154 A1 Dec. 28, 2023

Related U.S. Application Data

(63) Continuation of application No. 17/810,082, filed on Jun. 30, 2022.

(60) Provisional application No. 63/235,007, filed on Aug. 19, 2021.

(51) Int. Cl.
  *G21K 1/00* (2006.01)
  *G06N 10/40* (2022.01)

(52) U.S. Cl.
  CPC ............... *G21K 1/00* (2013.01); *G06N 10/40* (2022.01)

(58) Field of Classification Search
  CPC .......... G21K 1/00; G06N 10/40; H01J 49/422
  See application file for complete search history.

(56) References Cited

U.S. PATENT DOCUMENTS

2014/0100173 A1* 4/2014 Kodanko ............ C07F 15/0053
                                                  546/10
2014/0299766 A1  10/2014 Anderson et al.
(Continued)

FOREIGN PATENT DOCUMENTS

CN     112633508 A    4/2021
CN     112988451 A    6/2021
(Continued)

OTHER PUBLICATIONS

English Translation of TW Office Action, including Search Report, dated Feb. 27, 2024 for TW Application No. 111131080, 7 page(s).
(Continued)

*Primary Examiner* — David A Vanore
(74) *Attorney, Agent, or Firm* — Alston & Bird LLP

(57) ABSTRACT

Atomic object confinement apparatuses comprising periodic or quasi-periodic arrays of legs, including curved legs, and systems comprising such atomic object confinement apparatuses are provided. The atomic object confinement apparatus comprises a plurality of legs with each leg of the plurality of legs defining a one-dimensional trap segment; and a plurality of junctions with each junction of the plurality of junctions connecting at least two legs of the plurality of legs. The plurality of legs and the plurality of junctions are arranged into a periodic or quasi-periodic array of connected one-dimensional trap segments. The periodic array or quasi-periodic array comprises one or more smallest array elements. Each smallest array element of the one or more smallest array elements comprises at least one curved leg.

20 Claims, 8 Drawing Sheets

(56) References Cited

U.S. PATENT DOCUMENTS

| | | | |
|---|---|---|---|
| 2016/0064108 A1* | 3/2016 | Saffman | G21K 1/006 |
| | | | 250/251 |
| 2018/0068839 A1 | 3/2018 | Ibrahim et al. | |
| 2019/0198305 A1 | 6/2019 | Ibrahim et al. | |
| 2021/0183637 A1 | 6/2021 | Makotyn et al. | |
| 2022/0199391 A1* | 6/2022 | Hayes | G06N 10/20 |
| 2022/0327414 A1* | 10/2022 | Bohn | G02B 1/002 |
| 2023/0035427 A1* | 2/2023 | Burton | H01J 49/062 |
| 2023/0049490 A1* | 2/2023 | Feig | G06N 10/40 |
| 2023/0050581 A1* | 2/2023 | Kennedy | G06F 1/20 |
| 2023/0057368 A1* | 2/2023 | Langer | G21K 1/00 |
| 2023/0187095 A1* | 6/2023 | Volin | G21K 1/003 |
| 2023/0187096 A1* | 6/2023 | Ransford | G21K 1/003 |
| | | | 250/251 |
| 2023/0197430 A1* | 6/2023 | Burton | H01J 49/0013 |
| | | | 250/281 |
| 2023/0229956 A1* | 7/2023 | Swallows | G06N 10/40 |
| | | | 716/100 |
| 2024/0112057 A1* | 4/2024 | Bohn | G06N 10/40 |
| 2024/0310328 A1* | 9/2024 | Marriott | G01N 27/623 |
| 2024/0310330 A1* | 9/2024 | Marriott | H01J 49/0495 |

FOREIGN PATENT DOCUMENTS

| | | |
|---|---|---|
| CN | 113011591 A | 6/2021 |
| JP | 2016-514896 A | 5/2016 |
| JP | 2019-530148 A | 10/2019 |
| JP | 2021-097043 A | 6/2021 |
| WO | 2022/095319 A1 | 5/2022 |
| WO | 2022/166199 A1 | 8/2022 |

OTHER PUBLICATIONS

Ion Quantum Technology Group, "Quantum information processing with global radiation fields", University of Sussex, dated Apr. 23, 2021, retrieved from the Internet at <https://web.archive.org/web/20210423084948/https://www.sussex.ac.uk/physics/iqt/rsearch/quantum-information-processing-with-globalradiation-fields/> on Feb. 26, 2024, 11 pages.

TW Office Action, including Search Report, Mailed on Feb. 27, 2024 for TW Application No. 111131080, 7 page(s).

Extended European search report Mailed on Mar. 22, 2024 for EP Application No. 23208414, 7 page(s).

English Translation of TW Office Action, including Search Report dated Jun. 27, 2024 for TW Application No. 112145738, 5 page(s).

TW Office Action, including Search Report Mailed on Jun. 27, 2024 for TW Application No. 112145738, 5 page(s).

Amini, J.M., et al., "Toward scalable ion traps for quantum information processing," New Journal of Physics, Mar. 16, 2010, 16 pages, vol. 12, No. 033031, retrieved from the Internet at <URL://https://iopscience.iop.org/article/10.1088/1367-2630/12/3/033031/pdf> on Mar. 13, 2023.

Anonymous, "Quantum information processing-Ion Quantum Technology Group," Apr. 23, 2021, retrieved from the Internet at <URL:https://web.archive.org/web/20210423084948/https://www.sussex.ac.uk/physics/iqt/rsearch/quantum-information-processing-with-global-radiation-fields/> retrieved on Jan. 17, 2023, 12 pages.

Blakestad, R. Bradford, "Transport of Trapped-Ion Qubits within a Scalable Quantum Processor," Ph.D. Thesis, University of Colorado (2010) retrieved from the Internet at <URL: https://www.nist.gov/system/files/documents/2017/05/09/blakestad2010thesis.pdf> on Feb. 1, 2023, 240 pages.

Clark, Susan, "Trapped Ion Experiments at Sandia National Laboratories", Waterloo 2018, 33 pages, retrieved from the Internet at <URL://https://www.osti.gov/servlets/purl/1593626> on Mar. 13, 2023.

English Translation of JP Office Action, including Search Report, dated Oct. 10, 2023 for JP Application No. 2022130751, 4 page(s).
European search opinion Mailed on Feb. 1, 2023 for EP Application No. 22188830.

European search report Mailed on Feb. 2, 2023 for EP Application No. 22188830.

Hensinger, W.K., et al., "T-junction ion trap array for two-dimensional ion shuttling, storage, and manipulation", Applied Physics Letters, Jan. 17, 2006, 4 pages, vol. 88, No. 034101, retrieved from the Internet at <URL://https://iontrap.umd.edu/wp-content/uploads/2012/12/T-junction-ion-trap-array-for-two-dimensional-ion-shuttling-storage-and-manipulation.pdf> on Mar. 13, 2023.

JP Office Action, including Search Report, Mailed on Oct. 10, 2023 for JP Application No. 2022130751, 4 page(s).

Kielpinski, D., et al., "Architecture for a large-scale ion-trap quantum computer", Nature, Jun. 13, 2002, pp. 709-711, vol. 471, retrieved from the Internet at <URL://https://www.researchgate.net/publication/11308739_Architecture_for_a_large-scale_ion-trap_quantum_computer/link/0912f50c7546f933b9000000/download> on Mar. 13, 2023.

Lekitsch, Bjoern, et al., "Blueprint for a microwave trapped ion quantum computer", Science Advances, Feb. 1, 2027, 11 pages, vol. 3, No. e1601540, retrieved from the Internet at <URL://https://www.sussex.ac.uk/physics/iqt/blueprint.pdf> on Mar. 13, 2023.

Lobser, Daniel, "High-fidelity quantum and classical control in microfabricated surface ion traps", Sandia National Laboratories, 2019, 57 pages, retrieved from the Internet at <URL://https://www.osti.gov/servlets/purl/1595899> on Mar. 13, 2023.

Murali, Prakash, et al., "Architecting Noisy Intermediate-Scale Trapped Ion Quantum Computers", Apr. 9, 2020, 14 pages, retrieved from the Internet at: <URL:https://arxiv.org/pdf/2004.04706.pdf> on Mar. 13, 2023.

Tabakov, Boyan, et al., "Assembling a Ring-Shaped Crystal in a Microfabricated Surface Ion Trap", Physical Review Applied, Sep. 1, 2015, 12 pages, vol. 4, No. 031001, retrieved from the Internet at <URL://https://arxiv.org/pdf/1501.06554.pdf> on Mar. 13, 2023.

UA OSC (The University of Arizona College of Optical Sciences), "OSC Colloquium: Curtis Volin, "Optical Engineering for Ion Trap Quantum Computers"," Mar. 7, 2022, retrieved from the Internet at <URL:https://www.youtube.com/watch?v=FQIG9SHgfqw> on Jan. 17, 2023, 2 pages.

Webber, Mark, et al., "Efficient Qubit Routing for a Globally Connected Trapped Ion Quantum Computer", arXiv [online], Sep. 19, 2020, [date of search: Sep. 28, 2023], pp. 1-13, Internet <URL: https://arxiv.org/abs/2002. 12782, 14 pages.

Wesenberg, J.H., "Ideal Intersections for radio-frequency trap networks", Physical Review A, Atomic, Molecular, and Optical Physics, Jan. 2009, 9 pages, arXiv:0802.3162v2, retrieved from the Internet at <URL://https://www.researchgate.net/publication/228928813_Ideal_intersections_for_radio-frequency_trap_networks/link/5601c24108aed9851827cbab/download> on Mar. 13, 2023.

Wineland, D.J., et al., "Experimental Issues in Coherent Quantum-State Manipulation of Trapped Atomic Ions", Journal of Research of the National Institute of Standards and Technology, May-Jun. 1998, pp. 259-328, vol. 103, No. 3, National Institute of Standards and Technology, U.S.

Wright, Kenneth, et al., "Reliable transport through a microfabricated X-junction surface-electrode ion trap", New Journal of Physics, Mar. 4, 2013, 13 pages, vol. 15, No. 033004, retrieved from the Internet at <URL://https://iopscience.iop.org/article/10.1088/1367-2630/15/3/033004/pdf> on Mar. 10, 2023.

English translation of TW Notice of Allowance dated May 31, 2024 for TW Application No. 111131080, 2 page(s).

JP Decision to Grant Mailed on May 20, 2024 for JP Application No. 2022130751, 5 page(s).

TW Notice of Allowance Mailed on May 31, 2024 for TW Application No. 111131080, 2 page(s).

English Translation of JP Office Action dated Jan. 29, 2024 for JP Application No. 2022130751, 3 page(s).

JP Office Action Mailed on Jan. 29, 2024 for JP Application No. 2022130751, 3 page(s).

Non-Final Rejection Mailed on Oct. 25, 2024 for U.S. Appl. No. 17/810,082, 9 page(s).

CN Office Action, including Search Report Mailed on Oct. 31, 2024 for CN Application No. 202210985658, 7 page(s).

(56) References Cited

OTHER PUBLICATIONS

English Translation of CN Office Action, including Search Report dated Oct. 31, 2024 for CN Application No. 202210985658, 9 page(s).
Ji, Wei-Bang, et al., Scalable Grooved Planar Ion Chip Design for Quantum Information Processing, Acta Optica Sinica, Jul. 2012, vol. 32, No. 7, pp. 727001-1 to 727001-5, the Chinese Optical Society, China, (English Abstract only).
English Translation of TW Office Action dated Oct. 1, 2024 for TW Application No. 112145738, 6 page(s).
TW Notice of Allowance Mailed on Oct. 1, 2024 for TW Application No. 112145738, 6 page(s).
English Translation of JP Notice of Allowance, including Search Report dated Dec. 9, 2024 for JP Application No. 2024001962, 16 page(s).
JP Notice of Allowance, including Search Report Mailed on Dec. 9, 2024 for JP Application No. 2024001962, 13 page(s).
Notice of Allowance and Fees Due (PTOL-85) Mailed on Feb. 19, 2025 for U.S. Appl. No. 17/810,082, 7 page(s).
CN Notice of Allowance Mailed on Mar. 24, 2025 for CN Application No. 202210985658, 2 page(s).
English translation of CN Notice of Allowance dated Mar. 24, 2025 for CN Application No. 202210985658, 2 page(s).

* cited by examiner

MULTI-DIMENSIONAL ATOMIC OBJECT CONFINEMENT APPARATUS

CROSS-REFERENCE TO RELATED APPLICATIONS

This application is a continuation of U.S. application Ser. No. 17/810,082, filed Jun. 30, 2022, which claims priority to U.S. Application No. 63/235,007, filed Aug. 19, 2021, the contents of which are hereby incorporated by reference herein in their entireties.

TECHNICAL FIELD

Various embodiments relate to multi-dimensional atomic object confinement apparatuses having curved legs and systems that include multi-dimensional ion trap apparatuses having curved legs. For example, various embodiments relate to multi-dimensional atomic object confinement apparatuses that have periodic and/or quasi-periodic arrays of legs, including curved legs, that are connected by junctions.

BACKGROUND

An ion trap can use a combination of electrical and magnetic fields to capture a plurality of ions in a potential well. Ions can be trapped for a number of purposes, which may include mass spectrometry, research, and/or controlling quantum states of the trapped ions, for example. In various scenarios, a multi-dimensional (e.g., two-dimensional) ion trap may be used to trap a plurality of ions. In general, a multi-dimensional ion trap comprises a plurality of one-dimensional trap segments that are connected to one another via one or more junctions. Through applied effort, ingenuity, and innovation many deficiencies of such prior ion traps and systems incorporating such ion traps therefore have been solved by developing solutions that are structured in accordance with the embodiments of the present invention, many examples of which are described in detail herein.

BRIEF SUMMARY OF EXAMPLE EMBODIMENTS

Example embodiments provide multi-dimensional atomic object confinement apparatuses and/or system comprising multi-dimensional atomic object confinement apparatuses that are formed from a periodic or quasi-periodic array of one-dimensional confinement segments connected via junctions. In various embodiments, the periodic or quasi-periodic array comprises one-dimensional confinement segments, referred to as legs herein, that are curved. For example, the curved legs may take the form of a sine or cosine function, an odd function or an even function, and/or any other curved one-dimensional segment. In various embodiments, the atomic object confinement apparatus is an ion trap or other confinement apparatus configured to confine a plurality of atomic objects. In various embodiments, the atomic objects are ions, atoms, multi-ion or multi-atom groups or crystals, neutral or ionic molecules, and/or the like.

According to a first aspect, an atomic object confinement apparatus comprising a plurality of legs, each leg of the plurality of legs defining a one-dimensional trap segment; and a plurality of junctions, each junction of the plurality of junctions connecting at least two legs of the plurality of legs. The plurality of legs and the plurality of junctions are arranged into a periodic or quasi-periodic array of connected one-dimensional trap segments. The periodic array or quasi-periodic array comprises one or more smallest array elements. Each smallest array element of the one or more smallest array elements comprises at least one curved leg.

In an example embodiment, the at least one curved leg has a first end disposed at a first junction and a second end disposed at a second junction and a length of the at least one curved leg is longer than a straight line distance between the first junction and the second junction.

In an example embodiment, each leg of the plurality of legs is a curved leg.

In an example embodiment, the array is configured such that a straight line drawn tangent to a leg of the plurality of legs at a first point is tangent to additional legs of the plurality of legs at a periodicity or sub-harmonic of the periodicity of the array and either (a) intersects at a discrete point or (b) does not intersect a remainder of the plurality of legs.

In an example embodiment, the array is configured such that a straight line drawn perpendicular to a leg of the plurality of legs and perpendicular to additional legs at a periodicity or sub-harmonic of the periodicity of the array.

In an example embodiment, the array is configured such that a straight line drawn tangent to a group of legs at a periodicity or sub-harmonic of the periodicity of the array, the group of legs forming a row or column, and the straight line not intersecting any leg of the group of legs at any other point along the leg.

In an example embodiment, the array is configured such that a straight line drawn tangent to a leg of the plurality of legs is not tangent to any other leg of the plurality of legs within a given number of periods of the array from the leg.

In an example embodiment, the array is configured such that a straight line drawn perpendicular to a leg of the plurality of legs at some point is neither (a) tangent to any other leg of the plurality of legs nor (b) perpendicular to a point of another leg of the plurality of legs within a given number of periods of the array from the leg.

In an example embodiment, each smallest array element of the one or more smallest array elements comprises at least one straight leg.

In an example embodiment, the array is configured such that at least one of the following are satisfied (i) a first straight line drawn tangent to a leg of the plurality of legs at a first point is tangent to a first set of additional legs of the plurality of legs at a periodicity or sub-harmonic of the periodicity of the array and either (a) intersects at a discrete point or (b) does not intersect a remainder of the plurality of legs, (ii) a second straight line drawn perpendicular to the leg and perpendicular to a second set of additional legs of the plurality of legs at the periodicity or sub-harmonic of the periodicity of the array, (iii) a third straight line drawn tangent to a group of legs at the periodicity or sub-harmonic of the periodicity of the array, the group of legs forming a row or column, and the third straight line not intersecting any leg of the group of legs at any other point along the leg, (iv) a fourth straight line drawn tangent to the leg is not tangent to any other leg of the plurality of legs within a given number of periods of the array from the leg, or (v) a fifth straight line drawn perpendicular to the leg at some point is neither (a) tangent to any other leg of the plurality of legs nor (b) perpendicular to a point of another leg of the plurality of legs within a given number of periods of the array from the leg.

In an example embodiment, the array is configured such that at least two of the following are satisfied (i) a first straight line drawn tangent to a leg of the plurality of legs at a first point is tangent to a first set of additional legs of the plurality of legs at a periodicity or sub-harmonic of the periodicity of the array and either (a) intersects at a discrete point or (b) does not intersect a remainder of the plurality of legs, (ii) a second straight line drawn perpendicular to the leg and perpendicular to a second set of additional legs of the plurality of legs at the periodicity or sub-harmonic of the periodicity of the array, (iii) a third straight line drawn tangent to a group of legs at the periodicity or sub-harmonic of the periodicity of the array, the group of legs forming a row or column, and the third straight line not intersecting any leg of the group of legs at any other point along the leg, (iv) a fourth straight line drawn tangent to the leg is not tangent to any other leg of the plurality of legs within a given number of periods of the array from the leg, or (v) a fifth straight line drawn perpendicular to the leg at some point is neither (a) tangent to any other leg of the plurality of legs nor (b) perpendicular to a point of another leg of the plurality of legs within a given number of periods of the array from the leg.

According to another aspect, a quantum computer is provided. In an example embodiment, the quantum computer comprises a controller; and an atomic object confinement apparatus. The controller is configured to cause one or more voltage signals to be applied to respective electrodes of the atomic object confinement apparatus. The atomic object confinement apparatus comprises a plurality of legs, each leg of the plurality of legs defining a one-dimensional trap segment; and a plurality of junctions, each junction of the plurality of junctions connecting at least two legs of the plurality of legs. The plurality of legs and the plurality of junctions are arranged into a periodic or quasi-periodic array of connected one-dimensional trap segments. The periodic array or quasi-periodic array comprises one or more smallest array elements. Each smallest array element of the one or more smallest array elements comprises at least one curved leg.

In an example embodiment, the controller is configured to cause (nearly and/or approximately) parallel operations to be performed on atomic objects confined by the atomic object confinement apparatus.

In an example embodiment, the (nearly and/or approximately) parallel operations comprise a first operation performed in a first smallest array element of the one or more smallest array elements and a second operation performed in a second smallest array element of the one or more smallest array elements, the first operation and the second operation performed by one or more manipulation signals propagating along a same beam path.

In an example embodiment, the quantum computer further comprises one or more manipulation sources configured to be controlled by the controller to generate the one or more manipulation signals.

In an example embodiment, the at least one curved leg has a first end disposed at a first junction and a second end disposed at a second junction and a length of the at least one curved leg is longer than a straight line distance between the first junction and the second junction.

In an example embodiment, each leg of the plurality of legs is a curved leg.

In an example embodiment, each smallest array element of the one or more smallest array elements comprises at least one straight leg.

In an example embodiment, the array is configured such that at least one of the following is satisfied (i) a first straight line drawn tangent to a leg of the plurality of legs at a first point is tangent to a first set of additional legs of the plurality of legs at a periodicity or sub-harmonic of the periodicity of the array and either (a) intersects at a discrete point or (b) does not intersect a remainder of the plurality of legs, (ii) a second straight line drawn perpendicular to the leg and perpendicular to a second set of additional legs of the plurality of legs at the periodicity or sub-harmonic of the periodicity of the array, (iii) a third straight line drawn tangent to a group of legs at the periodicity or sub-harmonic of the periodicity of the array, the group of legs forming a row or column, and the third straight line not intersecting any leg of the group of legs at any other point along the leg, (iv) a fourth straight line drawn tangent to the leg is not tangent to any other leg of the plurality of legs within a given number of periods of the array from the leg, or (v) a fifth straight line drawn perpendicular to the leg at some point is neither (a) tangent to any other leg of the plurality of legs nor (b) perpendicular to a point of another leg of the plurality of legs within a given number of periods of the array from the leg.

In an example embodiment, the array is configured such that at least two of the following is satisfied (i) a first straight line drawn tangent to a leg of the plurality of legs at a first point is tangent to a first set of additional legs of the plurality of legs at a periodicity or sub-harmonic of the periodicity of the array and either (a) intersects at a discrete point or (b) does not intersect a remainder of the plurality of legs, (ii) a second straight line drawn perpendicular to the leg and perpendicular to a second set of additional legs of the plurality of legs at the periodicity or sub-harmonic of the periodicity of the array, (iii) a third straight line drawn tangent to a group of legs at the periodicity or sub-harmonic of the periodicity of the array, the group of legs forming a row or column, and the third straight line not intersecting any leg of the group of legs at any other point along the leg, (iv) a fourth straight line drawn tangent to the leg is not tangent to any other leg of the plurality of legs within a given number of periods of the array from the leg, or (v) a fifth straight line drawn perpendicular to the leg at some point is neither (a) tangent to any other leg of the plurality of legs nor (b) perpendicular to a point of another leg of the plurality of legs within a given number of periods of the array from the leg.

In an example embodiment, the quantum computer further comprises at least one voltage source, the at least one voltage source configured to be controlled by the controller to generate the one or more voltage signals.

According to still another aspect, a multi-dimensional atomic object confinement apparatus is provided. The multi-dimensional atomic object confinement apparatus comprises a plurality of legs arranged into a multi-dimensional periodic array. The plurality of legs comprise curved legs that are respectively disposed in accordance with a periodicity of the periodic array.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
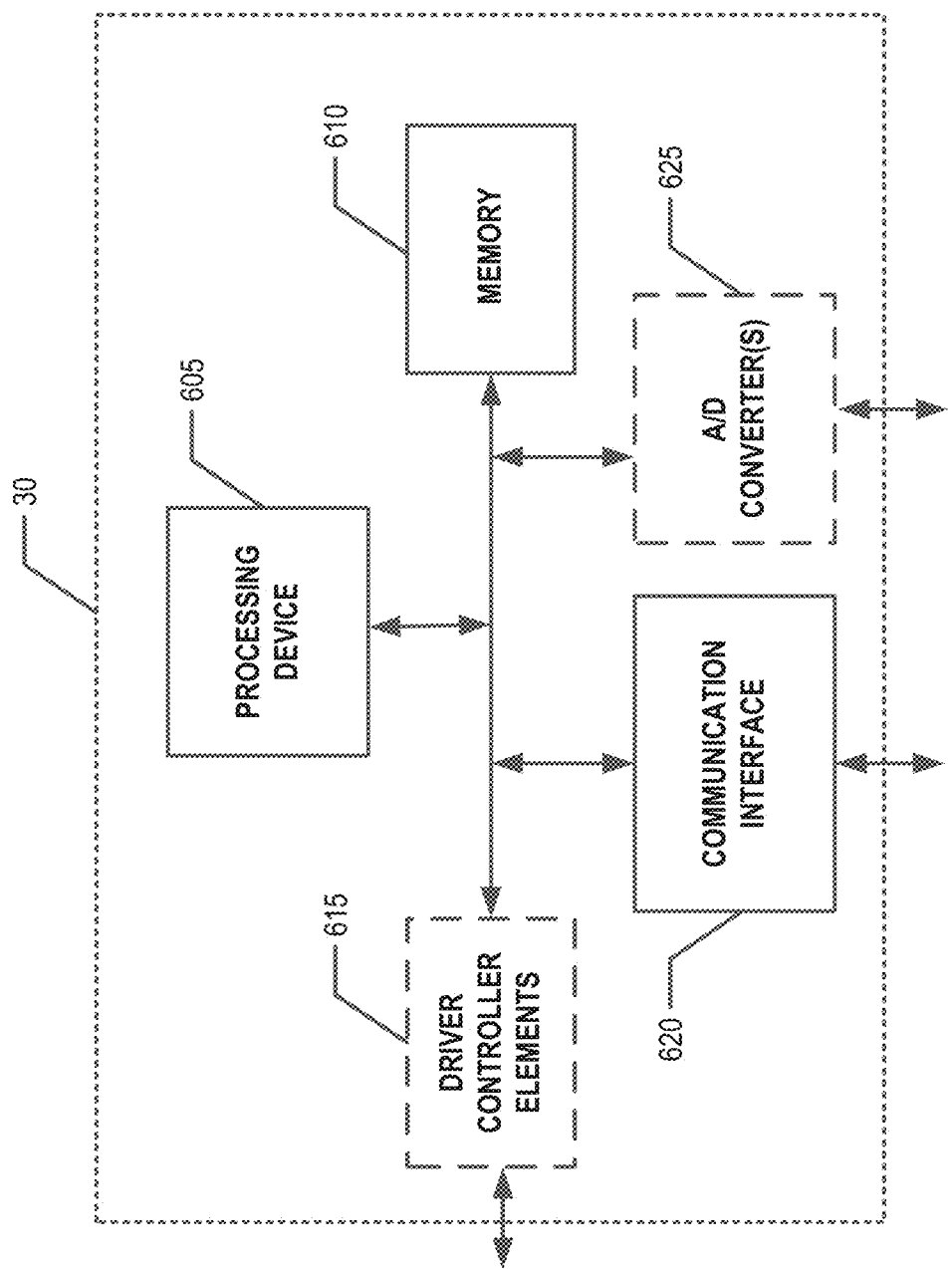
Figure 7:
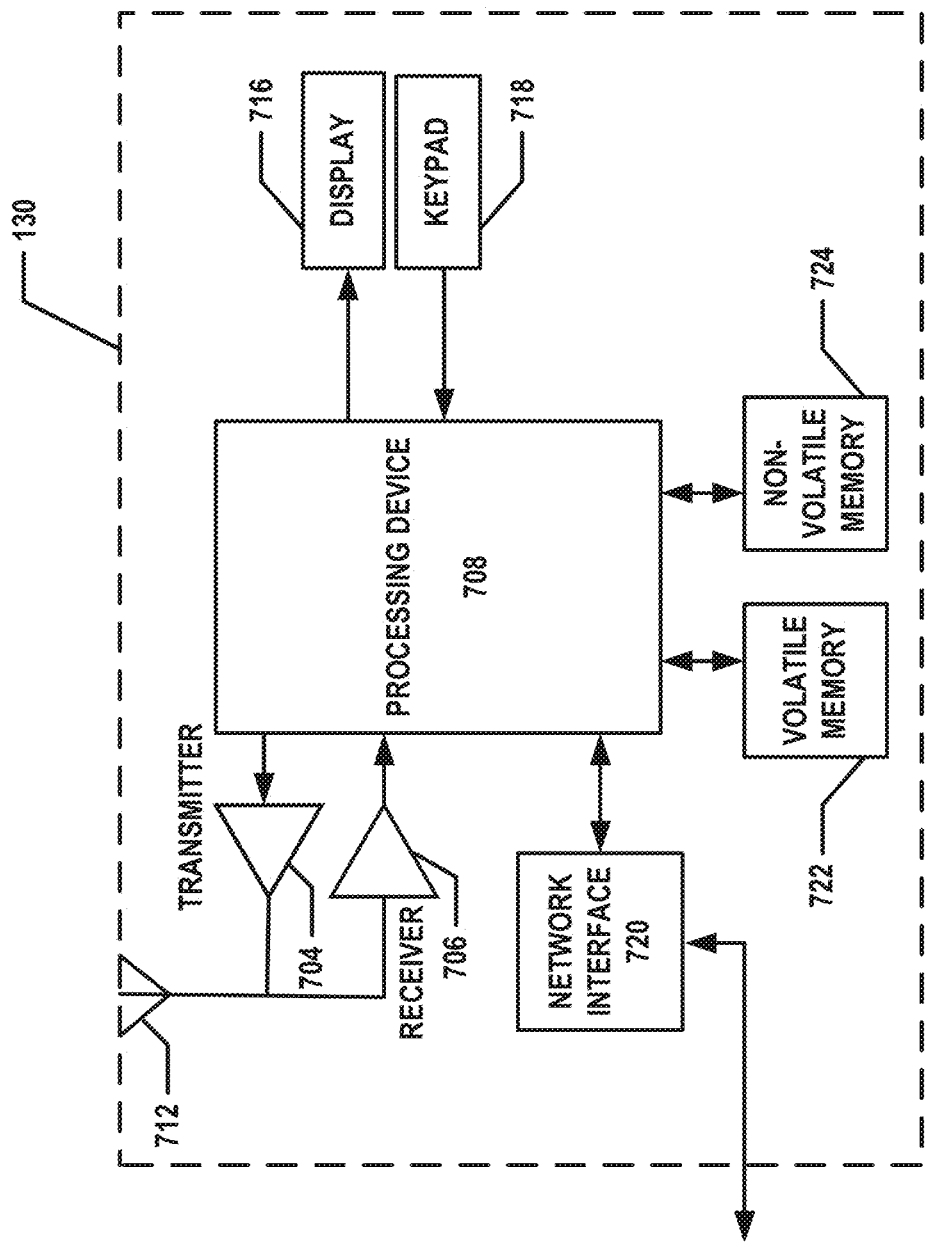

FIG. 6 provides a schematic diagram of an example controller of a quantum computer configured to perform one or more deterministic reshaping and/or reordering functions, according to various embodiments; and FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

In various embodiments, a multi-dimensional atomic object confinement apparatus is provided. The multi-dimensional atomic object confinement apparatus comprises a plurality of legs. Each leg of the plurality of legs is a one-dimensional confinement segment configured to trap atomic objects in a substantially one-dimensional trapping region. The multi-dimensional atomic object confinement apparatus comprises a periodic or quasi-periodic array formed by the plurality of legs connected via junctions. The plurality of legs comprises curved legs. For example, the curved legs may take the form of a sine or cosine function, an odd or even function, and/or any other curved one-dimensional segment. In an example embodiment, the plurality of legs further comprises one or more straight or not curved legs. In an example embodiment, each leg of the plurality of legs is a curved leg. For example, in various embodiments, the periodic or quasi-periodic array is formed from one or more smallest array elements with each smallest array element comprising at least one curved leg.

Various embodiments provide a system comprising the multi-dimensional atomic object confinement apparatus. For example, various embodiments provide a quantum processor or quantum computer comprising the multi-dimensional atomic object confinement apparatus comprising a periodic or quasi-periodic array of legs connected by junctions, with at least some of the legs being curved. In such embodiments, the qubits (e.g., quantum bits) of the quantum processor or quantum computer are atomic objects confined within the multi-dimensional atomic object confinement apparatus. The atomic objects are ions, atoms, ion groups or crystals, and/or the like, in various embodiments. In various embodiments, a periodic array of legs having the same geometry are useful in order to allow a shared set of trapping and/or transport (TT) electrode manipulation signals to be shared across the TT electrodes of similar type across the legs, thereby reducing total signal count and control complexity. Moreover, in various embodiments, the legs of the multi-atomic object confinement apparatus are curved in order to allow for parallel processing to be performed by the system. For example, the system may be a quantum processor configured to perform parallel operations in order to reduce the run time of a quantum circuit such that deeper quantum circuits can be implemented within the coherence time of the qubits (e.g., quantum bits) of the quantum processor.

Large-scale quantum computers are expected to solve problems that are currently intractable with today's technology, such as in the fields of chemistry, material science, and biology. Solving such problems will entail computations employing quantum algorithms implemented using deep quantum circuits. Performance of these deep quantum circuits will require a sufficient number of qubits to be available for use by the quantum processor and for the operations of the deep quantum circuits (e.g., including transportation of qubits, cooling of qubits, gating of qubits, etc.) to be able to be performed within a coherence time of the qubits. To enable the quantum processor to perform larger numbers of operations (e.g., deeper quantum circuits) in the time period defined by the coherence time of the qubits, various embodiments provide a multi-dimensional atomic object confinement apparatus configured to enable (nearly and/or approximate) parallelization of operations. For example, the multi-dimensional atomic object confinement apparatus of various embodiments is configured to enable a plurality of operations to be performed nearly and/or approximately in parallel. In various embodiments, the nearly and/or approximately parallel operations are performed serially at different points in the atomic object confinement apparatus as the manipulation signal propagates across the atomic object confinement apparatus. As used herein, the term operations refer to the application of manipulation signals (e.g., laser beams, microwave signals, magnetic fields, and/or the like) to multiple atomic objects to cause the controlled evolution of the quantum state of one or more atomic objects as qubits (e.g., cooling, gating, shelving, reading, etc.). In various embodiments, atomic objects may be able to be transported within the multi-dimensional atomic object confinement apparatus in parallel as well.

Additionally, the curved legs of the multi-dimensional atomic object confinement apparatus enable the use of shared manipulation signals (e.g., laser beams) to address multiple operating regions, whether in series or in parallel. Thus, the number of manipulation sources needed to perform operations is reduced and the complexity of the manipulation signal delivery system is also reduced. Also, the overall laser power usage can be reduced (e.g., fewer required beam paths, elimination of beam steering hardware, and/or the like). Moreover, the curved legs of the multi-dimensional atomic object confinement apparatus enable atomic objects to be able to be moved into or out of a corresponding beam path without requiring the atomic objects to be transported through junctions, which reduces the time needed for performing such atomic object transport and subsequent cooling of the transported atomic object(s).

Thus, various embodiments provide technical solutions to the technical problems relating to how to perform deep quantum circuits wherein a significant number of operations need to be performed within the coherence time of the qubits of the quantum processor performing the deep quantum circuit. For example, various embodiments provide improvements to the field of atomic object confinement apparatuses and quantum computers and/or processors comprising atomic object confinement apparatuses by providing an atomic object confinement apparatus that is configured to enable the parallel performance of various operations and/or atomic object transport, reduces the required cooling of atomic objects as a result of some transportation events, and reduces the number of manipulations sources and complexity of manipulation signal delivery system.

As noted above, various embodiments provide multi-dimensional atomic object confinement apparatuses that each comprise a periodic or quasi-periodic array formed by a plurality of legs connected via junctions wherein the plurality of legs comprise curved legs. For example, at least one leg of each smallest array element is a curved leg, in various embodiments. As used herein the smallest array element of an atomic object confinement apparatus that is the smallest group of legs and junctions that can be used to tile and/or form a tessellation of the layout of the atomic object confinement apparatus. In an example embodiment, each leg of plurality of legs of the atomic object confinement apparatus is a curved leg. In an example embodiment, the smallest array element of the atomic object confinement apparatus comprises a straight and/or non-curved leg.

In general, each leg of the atomic object confinement apparatus is defined by one or more radio frequency rails and/or electrodes (referred to as an RF rails herein) and at least one sequence or series of trapping and/or transport (TT) electrodes. When a radio frequency voltage signal is applied to the RF rails, a trapping potential is generated that is configured to trap and/or confine an atomic object within a one-dimensional trapping region. In particular, the application of the radio frequency voltage signal to the RF rails generates a pseudopotential. The one-dimensional trapping region comprises a radio frequency null. The radio frequency null is a one dimensional path that is defined by the direction of weakest pseudopotential gradient. At some points along the radio frequency null the pseudopotential is substantially equal to zero. Thus, the radio frequency null creates a stable one-dimensional trapping region. The legs of the atomic object confinement apparatus are substantially defined by the radio frequency null. In curved legs, the radio frequency null is curved in the same manner as the leg such that an atomic object trapped and/or confined within the leg of the atomic object confinement apparatus can be transported along the radio frequency null of the corresponding leg. The TT electrodes are configured to have a series of voltage signals applied thereto, where the time evolution of the series of voltage signals (at least in part due to the use of a low pass filter) is slow compared to the time evolution of the radio frequency voltage signals applied to the RF rails. In an example embodiment, the term slow means the highest frequency Fourier component with substantial non-zero amplitude is slower than the frequency of the signal applied to the RF rails.

Figure 1:
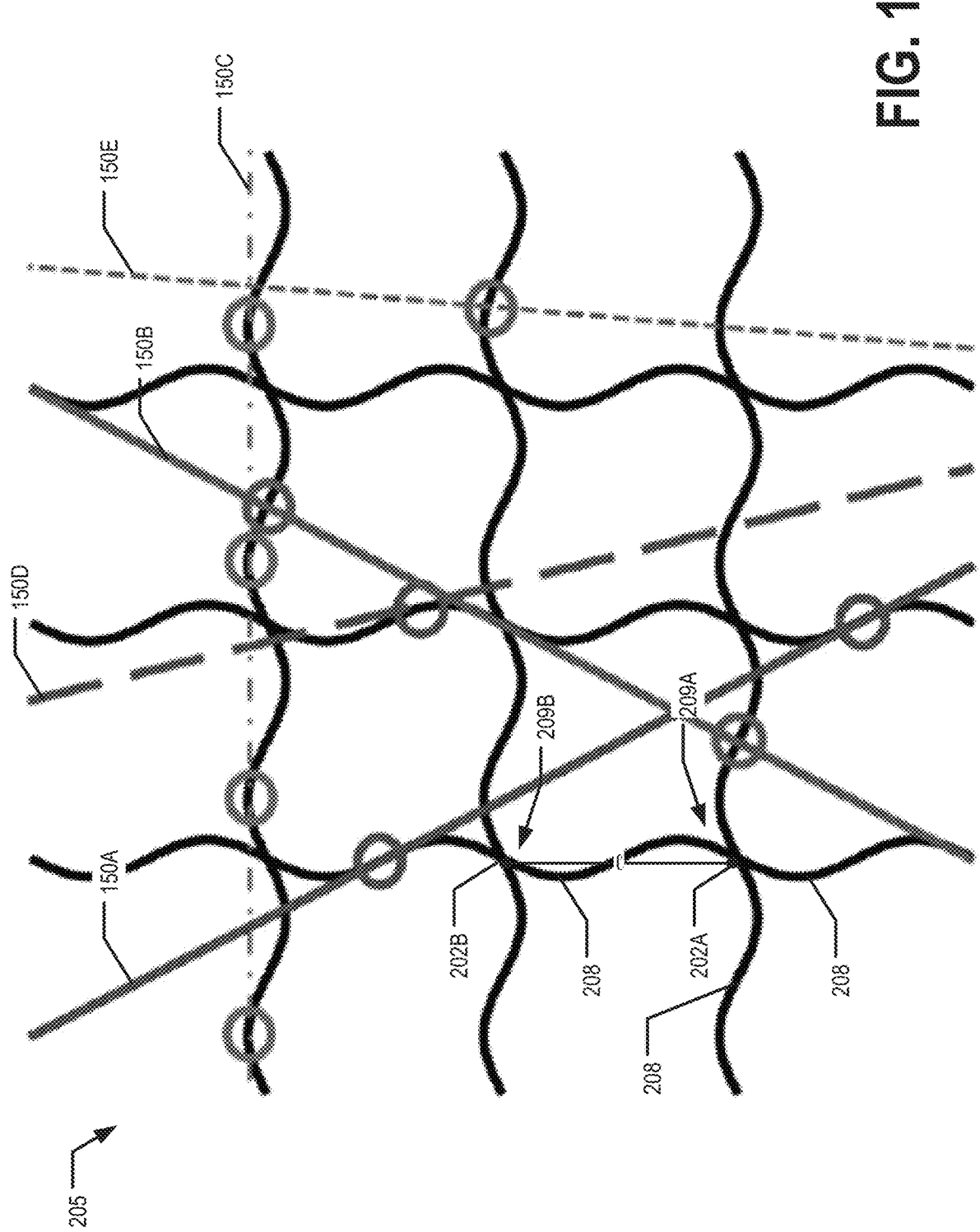
FIG. 1 illustrates an example array layout of an atomic object confinement apparatus, in accordance with an example embodiment.

FIG. 1 illustrates what is meant by a curved leg and/or an array comprising curved legs, as used herein. FIG. 1 illustrates an example arrangement of legs 208 of an atomic object confinement apparatus into an array 205, according to an example embodiment. The example array 205 shown in FIG. 1 is a periodic array of curved legs 208. Each leg 208 extends from a first end 209A adjacent, neighboring, and/or forming at least a portion of a first junction 202A to a second end 209B adjacent, neighboring, and/or forming at least a portion of a second junction 202B. The shortest distance (e.g., straight line distance and/or Euclidean distance) between the first junction 202A and the second junction 202B is an array distance l. The length of the curved leg 208 is greater than the array distance l. In an example embodiment, the length of the curved leg 208 is at least 1.05l, 1.10l, 1.15l, and/or the like.

FIG. 1 further illustrates five array with curved leg(s) criteria, shown by lines 150A, 150B, 150C, 150D, and 150E. As used herein to describe the array with curved leg(s) criteria, the terms "tangent" and "perpendicular" refer to angles in the plane of the atomic object confinement apparatus (e.g., in the plane of the two-dimensional projection illustrated in FIG. 1).

In various embodiments, the periodic or quasi-periodic array of legs that includes at least one curved leg in each smallest array element satisfy at least one of the five array with curved leg(s) criteria. In an example embodiment, the periodic or quasi-periodic array of legs that includes at least one curved leg in each smallest array element satisfies all five array with curved leg(s) criteria.

A first array with curved leg(s) criterion is illustrated by line 150A. Line 150A is a straight line that is tangent to at least one leg 208 at some point and also tangent to additional legs of the array at the periodicity (or some subharmonic periodicity) of the atomic object confinement apparatus and intersects other legs of the array only at discrete points (or not at all). The circles along lines 150A show the areas where the line 150A is tangent to respective legs 208.

A second array with curved leg(s) criterion is illustrated by the line 150B. Line 150B is a straight line that is perpendicular to at least one leg and is also perpendicular to additional legs at some subharmonic periodicity of the array.

A third array with curved leg(s) criterion is illustrated by the line 150C. Line 150C is a straight line that is tangent to some of the legs of the array at the periodicity and/or some subharmonic periodicity of the array along a column or row of the array but does not intersect those same legs at any out point along those legs.

A fourth array with curved leg(s) criterion is illustrated by the line 150D. Line 150D is a straight line that is tangent to a leg at some point and not tangent to any other portion of any leg across a given number of periods of the array. For example, if the curved legs are defined by a periodic function corresponding to a period length, the line 150D is not tangent to any other portion of any leg within a distance of a given number times the period length from the leg 150D to which the straight line is tangent at the point.

A fifth array with curved leg(s) criterion is illustrated by line 150E. Line 150E is a straight line that is perpendicular to a leg at some point and is neither (a) tangent to any other leg of the array nor (b) perpendicular to the same point of the leg in other periods of the array across a given number of periods of the array. For example, if the curved legs are defined by a periodic function corresponding to a period length, the line 150E is not perpendicular to the same point of the leg in other periods of the array within a distance of a given number times the period length from the leg to which the straight line 150E is perpendicular at the point.

As noted above, the atomic object confinement apparatus comprises a plurality of legs connected via junctions into a periodic or quasi-periodic array. As used herein, a periodic array is an array for which a smallest array element can be defined that is smaller than the array as a whole. For example, the smallest array element can be used to generate the array via a tiling and/or tessellation (e.g., through one or more rotations and/or translations of the smallest array element). In other words, a periodic array is an array for which the topology and/or geometry of the array repeats with a defined period. A quasi-periodic array is an array in which the periodicity of the array is perturbed by a global distortion. In other words, a quasi-periodic array is nearly periodic, but the periodicity is perturbed in one or more dimensions.

Thus, various embodiments provide atomic object confinement apparatuses (and/or systems comprising such) that comprise a plurality of legs, including one or more curved legs, that are connected via junctions and that are arranged in a periodic or quasi-periodic arrays. The curved legs and/or the periodic or quasi-periodic arrays are configured such that the array satisfies one or more array with curved leg(s) criteria. For example, the curved legs and/or the periodic or quasi-periodic array may be configured to enable the atomic object confinement apparatus to be used to perform periodic operations on and/or transport of atomic objects confined by the atomic object confinement apparatus.

Figure 2:
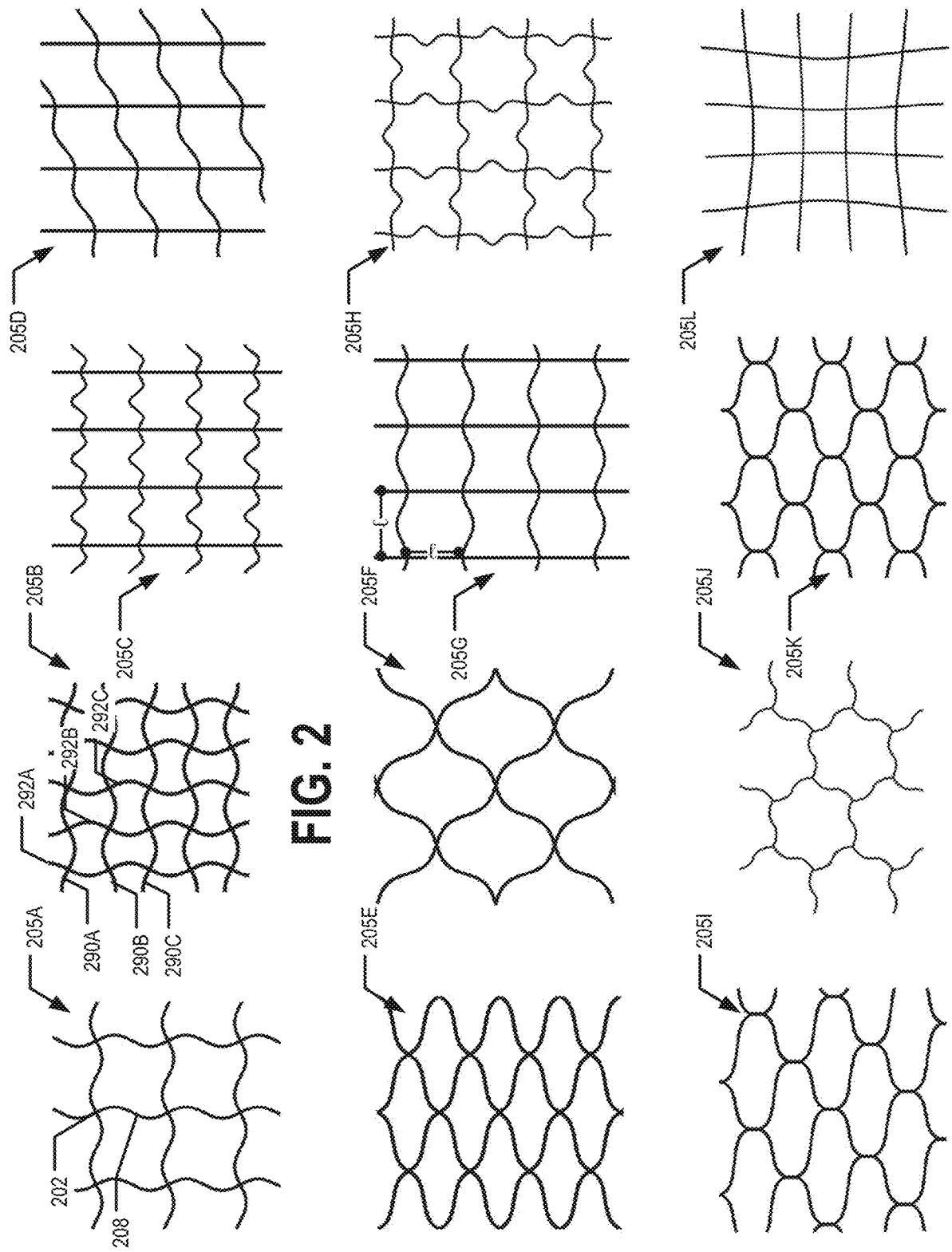
FIG. 2 illustrates a plurality of periodic and quasi-periodic array layouts, in accordance with various example embodiments.
Figure 3A:
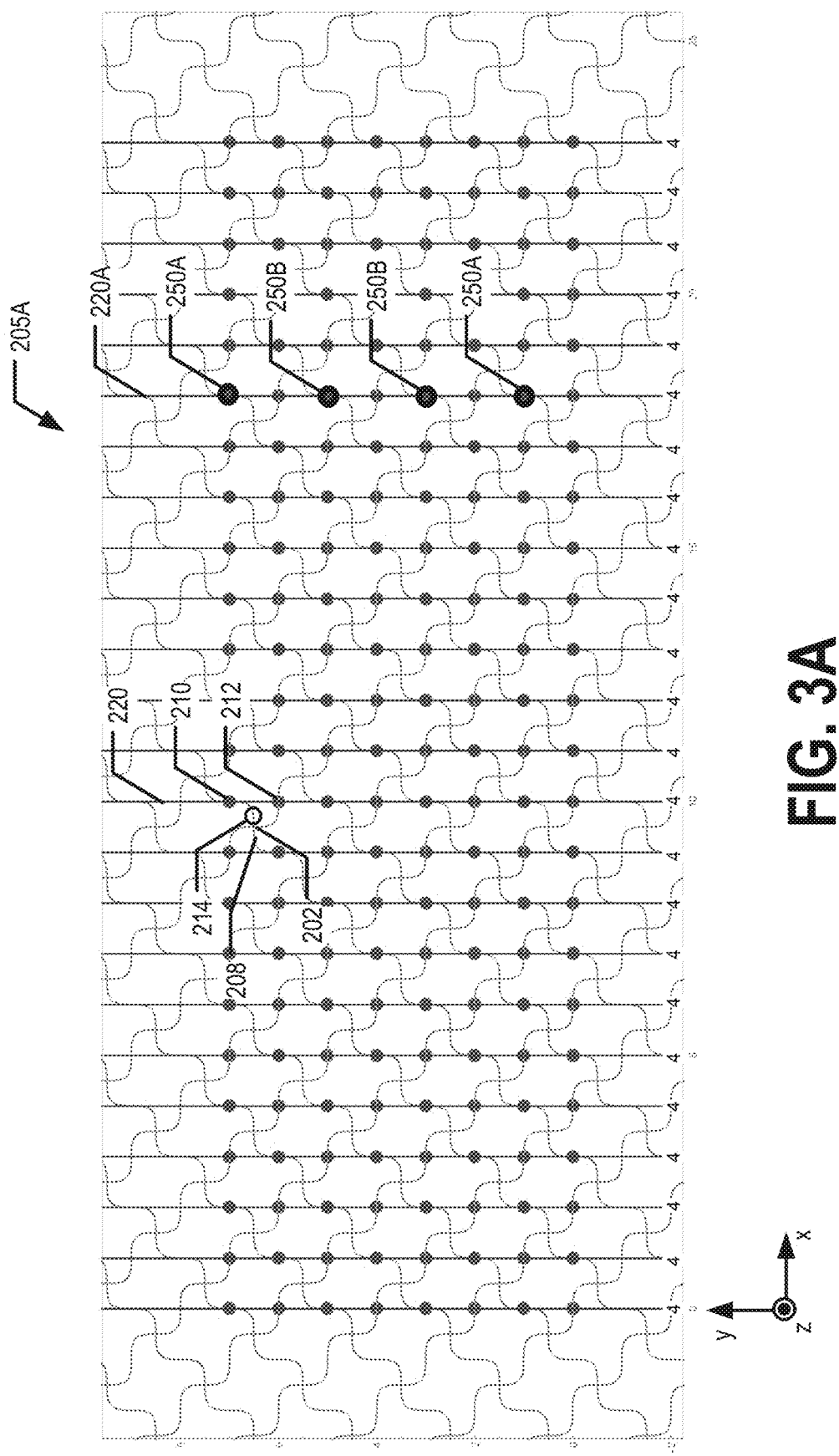
FIG. 3A is a schematic diagram illustrating an example layout of an atomic object confinement apparatus and some example beam paths of a quantum processor, in accordance with an example embodiment.

FIG. 2 illustrates a plurality of possible periodic or quasi-periodic arrays 205 (e.g., 205A-L) into which the legs of an atomic object confinement apparatus may be arranged, in accordance with various embodiments. Various other arrays 205 that include at least one curved leg in a smallest array element and/or that satisfy at least one of array with curved leg(s) criteria may be used in various other embodiments. As should be understood, the use of terms such as horizontal and vertical and/or rows and columns refers to how the arrays are illustrated in the corresponding figure. As should be understood, the array may be rotated to any angle about the trap normal (e.g., the normal to the surface of the trap, which is in the z-direction as illustrated in FIG. 3A).

The first array 205A is a square array in which each leg is one period of a periodic odd or even function. For example, a junction is located at the harmonic and/or period of the periodic odd or even function. For example, the first array 205A comprises rows of legs that are each one period of a sine function and columns of legs that are each one period of sine function (e.g., rotated with 90 degrees with respect to the rows of legs). The smallest array element of the first array 205A is formed by a connected group of two legs 208 that are connected by a junction 202.

For example, in an example embodiment, the atomic object confinement apparatus 200 comprises a plurality of legs 208. Each leg of the plurality of legs is a curved leg substantially described by one period of a sine function ($\sin(x)$ for $x=[0, 2\pi)$). The plurality of legs is arranged into a first array 205A comprising four-way junctions where the legs 208 that end at a junction 202 are substantially perpendicular to at least one other leg at the junction. In other words, the first array 205A comprises junctions 202 that connect legs that are arranged in substantially perpendicular rows and columns. This example embodiment of the atomic object confinement apparatus satisfies all five of the array with curved leg(s) criteria, as shown in FIG. 1.

The second array 205B is an alternating distortion array in which each leg is half a period of a periodic odd or even function and alternating rows and/or columns are inverted. For example, each row and each column is a periodic function (e.g., a periodic odd or even function) with junctions disposed at each half period of the periodic function. For example, row 290A comprises legs that are each half a period of a sine function with junctions located at the half period of the periodic odd or even function (sine function as illustrated here). Row 290B, which is adjacent and/or neighboring to row 290A, is inverted (e.g., flipped over a horizontal axis/line) with respect to row 290A. Row 290C, which is adjacent and/or neighboring to row 290B such that row 290B is the only row disposed between rows 290A and 290C, is inverted (e.g., flipped about a horizontal axis/line) with respect to row 290B and substantially the same as row 290A. Similarly, column 292A comprises legs that are each half a period of a sine function with junctions located at the half period of the periodic odd or even function (sine function as illustrated here). Column 292B, which is adjacent and/or neighboring to column 292A, is inverted (e.g., flipped over a vertical axis/line) with respect to column 292A. Column 292C, which is adjacent and/or neighboring to column 292B such that column 292B is the only column disposed between columns 292A and 292C, is inverted (e.g., flipped about a vertical axis/line) with respect to column 292B and substantially the same as column 292A. A smallest array element of the second array 205B is formed by a connected group of twelve legs that are connected via the nine junctions formed by the crossing of rows 290A, 290B, 290C with columns 292A, 292B, 292C.

The third array 205C and the fourth array 205D are examples of arrays where the array includes both curved legs and straight legs. As illustrated, the horizontal legs of the third array 205C and the fourth array 205D are periodic functions rotated at any angle about the trap normal (e.g., the normal to the surface of the trap, which is in the z-direction as illustrated in FIG. 3A). The vertical legs of the third array 205C and the fourth array 205D are straight legs with junctions located at the periodicity of the function. The junctions can be located at any desired interval along the vertical legs. In other words, the vertical legs can have any desired length appropriate for the intended application. The third array 205C comprises horizontal legs that are described by the function $\cos(x)+\cos(2x)$ with no rotation and the vertical legs having a length that matches the periodicity of the function describing the horizontal legs. The further array 205D comprises horizontal legs that are described by the function $\cos(x)$ rotated about the trap normal by 16 degrees and the vertical legs having a length that matches the periodicity of the function describing the horizontal legs. A smallest array element of the third array 205C or fourth array 205D is formed by two connected legs connected by a junction.

The fifth array 205E and the sixth array 205F are examples of odd function arrays. The legs are described by any odd or even periodic function rotated by any angle about the trap normal at a corresponding junction. The legs have a length corresponding to the periodicity of the odd or even function describing the legs. The array is formed by reflecting the cross-axis lines across a horizontal axis or line. For example, the legs of the fifth array 205E are described by $\sin(x)$ rotated 45 degrees about the trap normal. A smallest array element of the fifth array 205E or the sixth array 205F is formed by four connected legs connected by two junctions.

The seventh array 205G is an anisotrapic alternating distortion array. The horizontal legs are any periodic function rotated at any angle about the trap normal. The horizontal legs each have a length that corresponds to the periodicity of the periodic function that describes the horizontal legs. The vertical legs are straight lines having any desired length that is appropriate for the intended application. For example, the junctions can be located at any desired interval along the vertical legs. Adjacent, neighboring, and/or alternating rows of horizontal legs are inverted (e.g., flipped about a horizontal axis or line). The illustrated seventh array comprises horizontal legs described by cos(x) with no rotation about the trap normal and with the vertical legs having a length that matches the period of the function describing the horizontal legs.

The eighth array 205H is a star and cross array in which each leg is half a period of a periodic odd or even function. For example, each row and each column is a periodic function (e.g., a periodic odd or even function) with junctions disposed at each half period of the periodic function. Similar to the second array 205B, adjacent rows/columns are inverted (e.g., flipped about a horizontal/vertical axis or line) with respect to one another. Also similar to the second array 205B, the smallest array element of the eighth array 205H is formed by a connected group of eight legs that are connected via the four junctions formed by the crossing of three adjacent rows with three adjacent columns.

The ninth array 205I, tenth array 205J, and eleventh array 205K illustrate periodic arrays where the junctions are formed by the meeting of three legs. The first, second, third, fourth, fifth, sixth, seventh, and eighth arrays 205A-H each illustrate periodic arrays where the junctions are formed by the meeting of four legs.

For example, for the ninth array 205I, the smallest array element is composed of an irregular hexagon having 180 degree rotation symmetry. One or more sides of the hexagon are replaced by curved functions such that the resulting array comprises curved legs.

In another example, for the tenth array 205J, the smallest array element is composed of a regular hexagon where each leg is replaced by the same odd or even function (where the function is odd or even about the center of the leg). For example, the regular hexagons have 60 degree rotation symmetry about the center point of the hexagon. In the illustrated embodiment, the sides of the regular hexagon are replaced with curved legs described by a sine function with a period matching the length of the side of the hexagon.

For the eleventh array 205K, the smallest array element is composed of a hexagon having fold symmetry across both the x and y axes, the vertical legs are straight, and the other legs are curved legs described by an odd or even function. This is similar to the fifth array 205E, but with each four way junction replaced by a pair of three way junctions connected by a short straight leg. As should be understood, various other octagonal, hexagonal, square, and/or other grids having three way, four way, and/or more than four way junctions can be adapted with curved legs to provide periodic arrays having curved legs.

The twelfth array 205L is a quasi-periodic array having four way junctions. In the twelfth array 205L, the periodicity of the array is perturbed by a global distortion in two dimensions to provide the quasi-periodic array.

FIG. 3A illustrates an example array 205 of an atomic object confinement apparatus 200. The beam paths 220 shown drawn in the y-direction indicate how a beam (e.g., a laser beam and/or other manipulation signal) may propagate across the narrower dimension of the atomic object confinement apparatus 200, in the illustrated embodiment. In various embodiments, beam paths are defined substantially across the narrower dimension of the atomic object confinement apparatus (or in some instances along a diagonal) such that the manipulation signal propagating along the beam path traverses the atomic object confinement apparatus while the manipulation signal is still well collimated (e.g., the full-width half-maximum of the beam cross-section of the manipulation signal is at most a particular width). The filled dots indicate positions within the array 205 that, when an atomic object is located at that position, the a beam propagating along the beam path 220 will be incident on the atomic object substantially parallel to the radio frequency null of the corresponding leg at the position of the atomic object (positions 210) or substantially perpendicular to the radio frequency null of the corresponding leg at the position of the atomic object (positions 212). Thus, the array 205 and the beam paths 220 are configured such that a single manipulation beam may be simultaneously incident on a plurality of atomic objects. Moreover, the single manipulation beam can be simultaneously incident on atomic objects both substantially parallel and substantially perpendicular to the radio frequency null of the respective leg at the location of the respective atomic object. This feature of the atomic object confinement apparatus 200 enables the performance of a number of parallel operations by a quantum processor, for example, comprising the atomic object confinement apparatus 200. This feature further enables the use of a single manipulation source to address multiple operating regions and/or atomic objects, reducing the manipulation source power and/or number of manipulation sources and/or complexity of the manipulation source and/or manipulation signal delivery system. Moreover, each leg comprises positions, such as open dot 214, where the atomic object can be transported out of the path of the beam path 220 without having to be transported through a junction. This enables atomic objects to be removed from the parallel operations without requiring the timely performance of a junction transport and the subsequent cooling.

FIG. 3A further illustrates how the atomic object confinement apparatus 200 enables the performance of nearly and/or approximately parallel operations. For example, along beam path 220A, atomic objects may be located at the positions 250A, 250B. The atomic objects located at positions 250B may be moved off of the beam path 220A (without having to traverse a junction 202) such that the motional and/or internal states of the atomic objects located near positions 250B are unperturbed when a manipulation signal is applied to perform parallel operations on the atomic objects located at positions 250A. The atomic objects may then be moved back to the positions and the atomic objects located at positions 250A may be moved off of the beam path 220A (without having to traverse a junction 202) such that the motional and/or internal states of the atomic objects located near positions 250A are unperturbed when a manipulation signal is applied to the to perform parallel operations on the atomic objects located at positions 250B.

Thus, various embodiments enable the minimization of resources (e.g., the number of beams required to do gates) while compensating for variations in local trap and beam properties (e.g., divergence and clipping of the laser beam, variations in trap potentials, etc.) that do not allow full parallelization of the operation. For example, take a gate that changes the internal state of an atomic object proportional to the total manipulation signal flux incident on the atomic object (J/mm 2). When the manipulation signal is incident on all four atomic objects (those located at positions 250A, 250B), divergence of the manipulation signal (e.g., laser beam) means that each atomic object will experience a different optical intensity (W/mm 2) and therefore a slightly different gate operation. This effect can be compensated for by doing the gate on each atomic object serially, adjusting the length of each laser pulse to achieve an equal total flux on each manipulation signal. A partially parallel instance is possible (as described above with positions 250A, 250B) when the beam waist of the manipulation signal occurs and/or is located at exactly the midway point between the positions 250A and/or the positions 250B. In this case, the atomic objects located at positions 250A both see the same optical intensity. Also, the atomic objects located at positions 250B see the same optical intensity, although not the same as the atomic objects located at positions 250A.

Figure 3B:
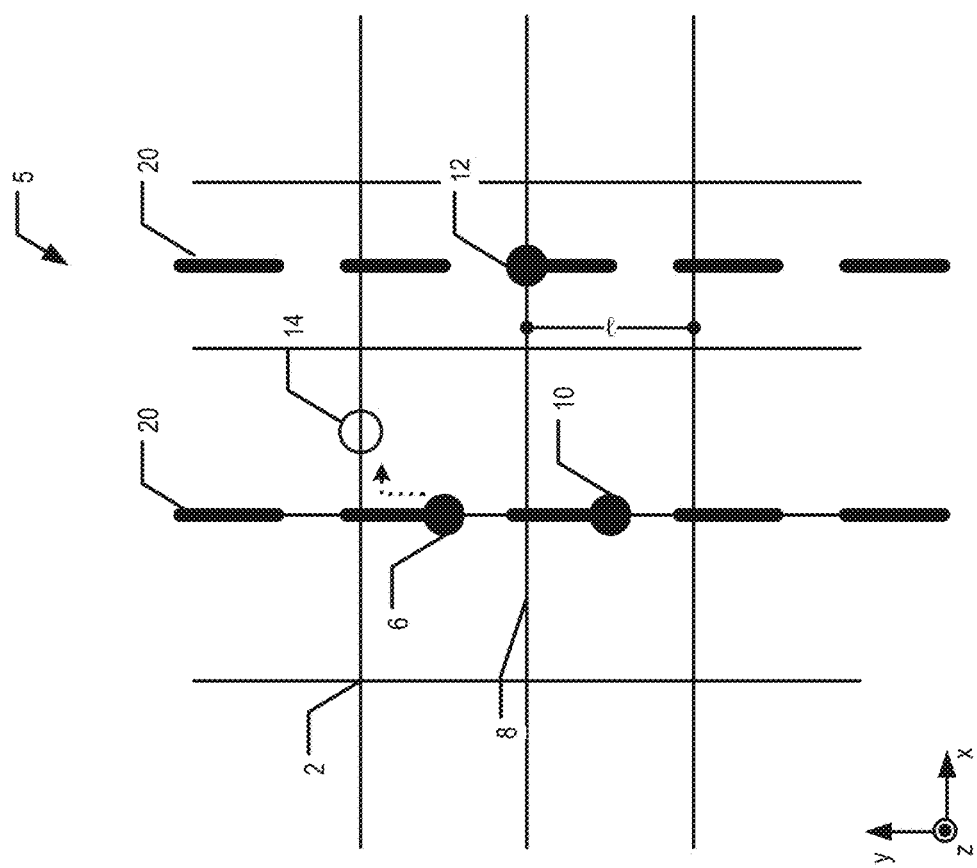
FIG. 3B is a schematic diagram illustrating a conventional straight leg atomic object confinement apparatus.

FIG. 3B illustrates a conventional straight leg array 5 comprising a plurality of legs 8 that are all straight (e.g., that are not curved and/or that have a length that is equal to the array distance l) and joined at junctions 2. Beams lines 20 illustrate how, in the conventional straight leg array 5, the entirety of a series of legs 8 is illuminated by the beam path 20 when the beam path is intended to be incident on a position 10 such that the beam path 20 is substantially parallel to the radio frequency null at the position 10. When an atomic object is located at a position 6 that is along the same series of legs 8 as the position 10 that is to be illuminated by the beam path 20, but the atomic object should not be illuminated by the beam path 20 (e.g., not have the operation being performed by the beam path 20 performed thereon), the atomic object must be transported through a junction 2 to position 14. Transporting an atomic object through a junction 2 is a slower process than transporting an atomic object along a similar length of a leg and may require significant cooling of the atomic object after the transport has occurred. Thus, it is desired to minimize the transport atomic objects through junctions 2. Moreover, when it is desired to illuminate a position 12 such that the beam path 20 is substantially perpendicular to the radio frequency null at that position, a different beam path 20 must be used. In other words, a single beam path 20 cannot both illuminate a position 10 where the beam path 20 is substantially parallel to the radio frequency null and a position 12 where the beam path 20 is substantially perpendicular to the radio frequency null. Thus, additional optics lines are required. As can be seen by comparing the example embodiment of a periodic array comprising curved legs shown in FIG. 3A and the conventional periodic array comprising straight legs shown in FIG. 3B, various embodiments of atomic object confinement apparatuses 200 provide significant technical advantages over conventional apparatuses.

Figure 4:
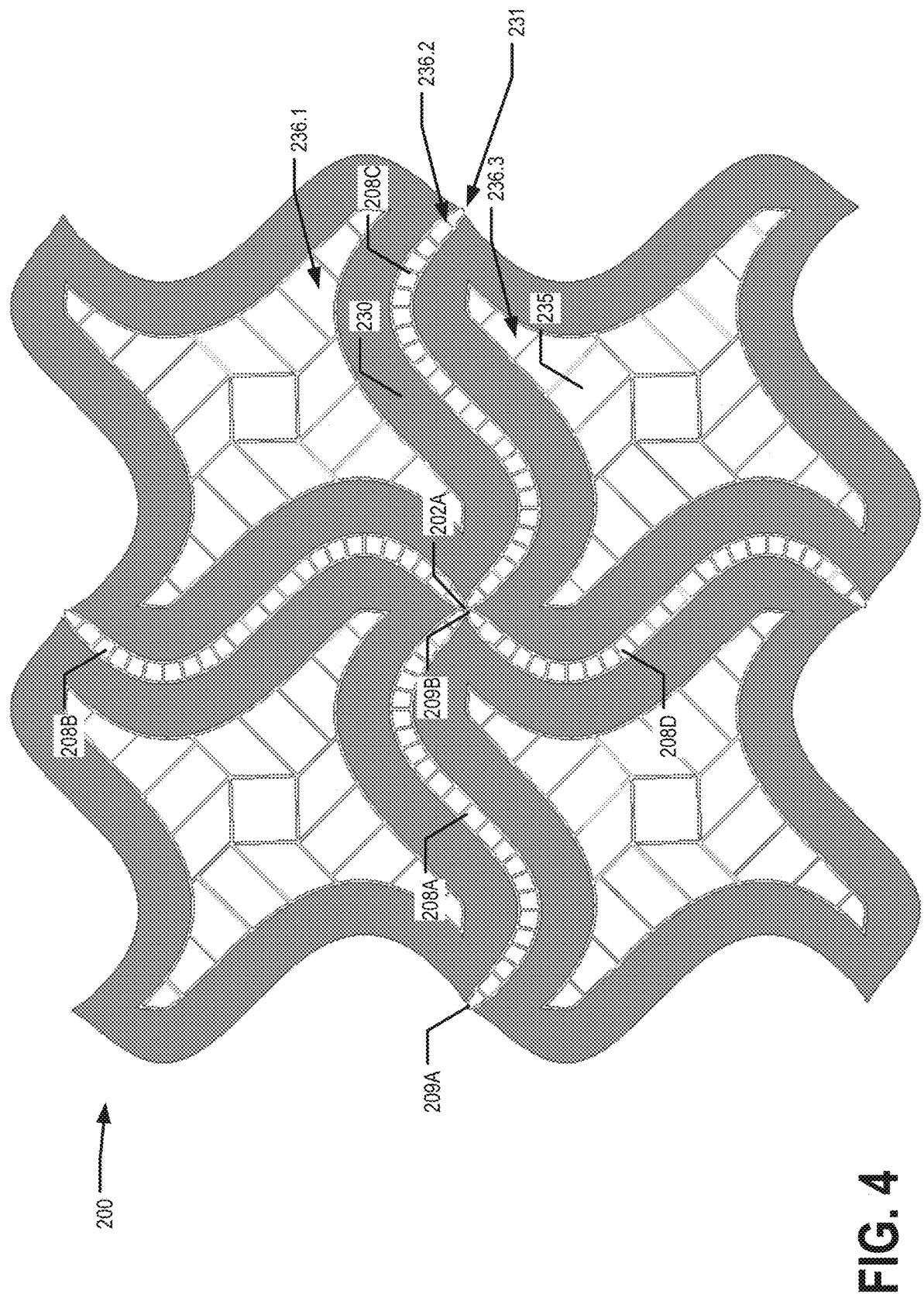
FIG. 4 is a schematic diagram of a portion of an atomic object confinement apparatus, in accordance with an example embodiment.

FIG. 4 provides a top schematic view of a portion of an example atomic object confinement apparatus 200. The example atomic object confinement apparatus 200 comprises a plurality of legs 208, including curved legs, that are arranged in a periodic array 205 and connected via junctions 202. In an example embodiment, the atomic object confinement apparatus 200 is a multi-dimensional (e.g., two or three-dimensional) surface ion trap, surface Paul trap, and/or the like configured to trap a plurality of atomic objects (e.g., ions, ion crystals, a and/or the like) therein. Each leg 208 of the atomic object confinement apparatus 200 extends a respective length between two respective ends 209A, 209B. In general (e.g., other than possibly along the edges of atomic object confinement apparatus 200), each end 209 of each leg 208 is connected to at least one other leg 208 by a junction 202. In general, a leg 208 of the atomic object confinement apparatus 200 is a one-dimensional segment and/or portion of the atomic object confinement apparatus 200. In particular, a leg 208 of the atomic object confinement apparatus 200 defines a substantially one-dimensional confinement region within which atomic objects may be confined. In general, a junction 202 is formed by two or more legs 208 meeting, joining, and/or abutting. At least two legs 208 of the two or more legs define one-dimensional confinement regions that are, at least proximate the junction, transverse to one another. For example, leg 208A is transverse to legs 208B and 208D, at least proximate the junction 202A.

In various embodiments, the atomic object confinement apparatus 200 comprises a plurality of legs 208 that includes curved legs and that are arranged in a periodic or quasi-periodic array. The shortest distance (e.g., straight line distance and/or Euclidean distance) between the two adjacent junctions 202 (e.g., the shortest path between the two adjacent junctions does not pass through and/or include any other junctions) is an array distance l. A leg 208 disposed between the two adjacent junctions 202 (e.g., having a first end 209A at one of the two adjacent junctions and a second end 209B at the other of the two adjacent junctions) is a curved leg when the path length along the leg is greater than the array distance l. In an example embodiment, the length of the curved leg 208 is at least 1.05l, 1.10l, 1.15l, and/or the like.

In various embodiments, the atomic object confinement apparatus 200 comprises a plurality of legs 208 that includes curved legs and that are arranged in a periodic or quasi-periodic array such that the array 205 satisfies at least one array with curved leg(s) criteria, as described above.

In an example embodiment, the atomic object confinement apparatus 200 is fabricated as part of an atomic object confinement apparatus chip and/or part of an atomic object confinement apparatus package. In an example embodiment, the atomic object confinement apparatus 200 is at least partially defined by a number of radio frequency (RF) rails 230. In various embodiments, the atomic object confinement apparatus 200 is at least partially defined by a number of sequences of trapping and/or transport (TT) electrodes 235. In various embodiments, a variety of TT electrode geometries, placements, layouts, and/or the like may be used. The illustrated TT electrode 235 geometry, placement, layout, and/or the like is provided for illustrative purposes and, in various embodiments, will be determined and/or configured based on the intended application of the atomic object confinement apparatus 200. In various embodiments, the upper surface of the atomic object confinement apparatus 200 has a planarized topology. For example, the upper surface of each RF rail 230 of the number of RF rails and the upper surface of each TT electrode 235 of the number of sequences of TT electrodes may be substantially coplanar. In an example embodiment, the surface of the atomic object confinement apparatus 200 is not planar and a plane is defined from which the height of the atomic objects above the "surface" of the atomic object confinement apparatus 200 is measured.

In various embodiments, each of the legs 208 of the atomic object confinement apparatus 200 comprises and/or is at least partially defined by a number (e.g., one or more) of RF rails 230. In an example embodiment, a leg 208 of the atomic object confinement apparatus 200 are formed with substantially parallel longitudinal axes. For example, when a leg 208 is defined by two or more RF rails 230, the two or more RF rails 230 extend substantially parallel to one another along the length of the leg 208. As used herein, substantially parallel indicates that the RF rails 230 that are substantially parallel to one another do not intersect or cross one another. For example, the RF rails 230 may be formed by starting with rectangular geometry and then perturbing the geometry by adding kinks, bends, and/or the like.

In various embodiments, two adjacent RF rails 230 may be separated (e.g., insulated) from one another by a longitudinal gap 231. For example, the longitudinal gap may define (in one or two dimensions) the confinement channel or region of the atomic object confinement apparatus 200 in which one or more atomic objects may be confined and/or trapped at various locations within the atomic object confinement apparatus. In various embodiments, the longitudinal gap defined thereby may extend substantially parallel to the adjacent RF rails 230 along the length of the corresponding leg 208. In an example embodiment, the longitudinal gap may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap has a width (e.g., distance between adjacent RF rails 230) of approximately 40 μm to 500 μm. In various embodiments, one or more sequences of TT electrodes 236.2 is disposed and/or formed within the longitudinal gap.

In various embodiments, the atomic object confinement apparatus 200 (and/or legs 208 and/or junctions 202 thereof) may be at least partially defined by a number of sequences of TT electrodes 236 (e.g., 236.1, 236.2, 236.3) each comprising a plurality of TT electrodes 235. In an example embodiment, each sequence of TT electrodes 236 that is associated with and/or at least partially defines a leg 208 is formed to extend substantially parallel to the one or more RF rails 230 that at least partially define the respective leg 208 along at least a portion of the length of the leg 208. For example, the three sequences of TT electrodes 236.1, 236.2, and 236.3 at least partially define the portion of leg 208C illustrated in FIG. 4. Each of the three sequences of TT electrodes 236.1, 236.2, and 236.3 comprise a plurality of TT electrodes 235. In various embodiments, the number of sequences of TT electrodes 236 that at least partially define each leg 208 comprises two, three, four, and/or another number of sequences of TT electrodes. In an example embodiment, the atomic object confinement apparatus 200 comprises a plurality of number of sequences of TT electrodes 236, with each number of sequences of TT electrodes at least partially defining a leg 208 and/or a junction 202 of the atomic object confinement apparatus 200. In some embodiments, each of the TT electrodes 235 are formed with substantially coplanar upper surfaces that are substantially coplanar with the upper surfaces of the RF rails 230.

In an example embodiment, a transverse gap may exist between neighboring and/or adjacent TT electrodes 235. In an example embodiment, the transverse gap may be empty space and/or at least partially filled with a dielectric material to prevent electrical communication between neighboring and/or adjacent electrodes 235. In an example embodiment, the transverse gap between neighboring and/or adjacent electrodes 235 may be in the range of approximately 1-10 μm.

In an example embodiment, a longitudinal gap exists between a sequence of TT electrodes 236 and a neighboring and/or adjacent RF rail 230. In an example embodiment, the longitudinal gap may be at least partially filled with a dielectric and/or insulating material to prevent electrical communication between TT electrodes 235 of the sequence of TT electrodes 326 and the RF rail 230. In an example embodiment, the longitudinal gap between neighboring and/ or adjacent electrodes may be in the range of approximately 1-10 μm.

In an example embodiment a number (e.g., pair) of RF rails 230 may be formed between a first sequence of TT electrodes 236.1 and a third sequence of TT electrodes 236.3 with a second sequence of TT electrodes 236.2 extending along the longitudinal channel 201 between the RF rails 230. For example, each sequence of TT electrodes 236 of a particular leg 208 may extend in a direction substantially parallel to the corresponding RF rails 230 along at least a portion of the length of the particular leg 208. In various embodiments, the upper surfaces of the TT electrodes 235 are substantially coplanar with the upper surfaces of the RF rails 230.

In various embodiments, periodic voltage signals (e.g., voltage signals having a radio frequency periodicity) may be applied to the RF rails 230 to generate an electric and/or magnetic field that acts to maintain an atomic object confined and/or trapped within the atomic object confinement apparatus 200. For example, the RF rails 230 that at least in part define a particular leg 208 generate an electric pseudopotential that confines and/or traps atomic objects within the particular leg 208 in directions transverse to the corresponding one-dimensional segment and/or portion of the atomic object confinement apparatus 200. For example, the RF rails 230 are configured to, when a periodic voltage signal is applied thereto, generate a pseudopotential that confines and/or traps atomic objects along a one-dimensional segment illustrated by a dashed line in FIG. 4. For example, the radio frequency null along leg 208 defines a transport path along the leg along which atomic objects can be transported along the length of the leg 208.

In various embodiments, the TT electrodes 235 are configured to have controlling voltage signals applied thereto such that the TT electrodes 235 generate a time-dependent electric potential field that causes the atomic objects to be transported along the transport path (e.g., along the RF null) for the leg 208. For example, the electrical and/or magnetic field generated at least in part by controlling voltage signals applied to the TT electrodes 235 of a particular leg 208 of the sequences of TT electrodes 236 may trap at least one atomic object in a potential well above the upper surface of the second sequence of TT electrodes (e.g., 236.2 for leg 208C) and/or the longitudinal gap 201 of the respective leg 208C. Additionally, the controlling voltage signals applied to the electrodes 235 may cause atomic objects confined and/or trapped within the potential well above the upper surface of the second sequence of TT electrodes 236.2 and/or the longitudinal gap 201 to traverse trajectories that substantially follow and/or are along the RF null for the corresponding leg 208C, when the atomic objects are located within the leg 208C.

In various embodiments, TT electrodes 235 are also disposed within the junction 202. In various embodiments, TT electrodes 235 disposed proximate a junction 202 are configured such that when controlling voltage signals are applied to the TT electrodes 235 proximate the junction 202, the TT electrodes 235 generate an electric and/or magnetic field configured to cause atomic objects to be transported along a transport path through the junction 202.

Figure 5:
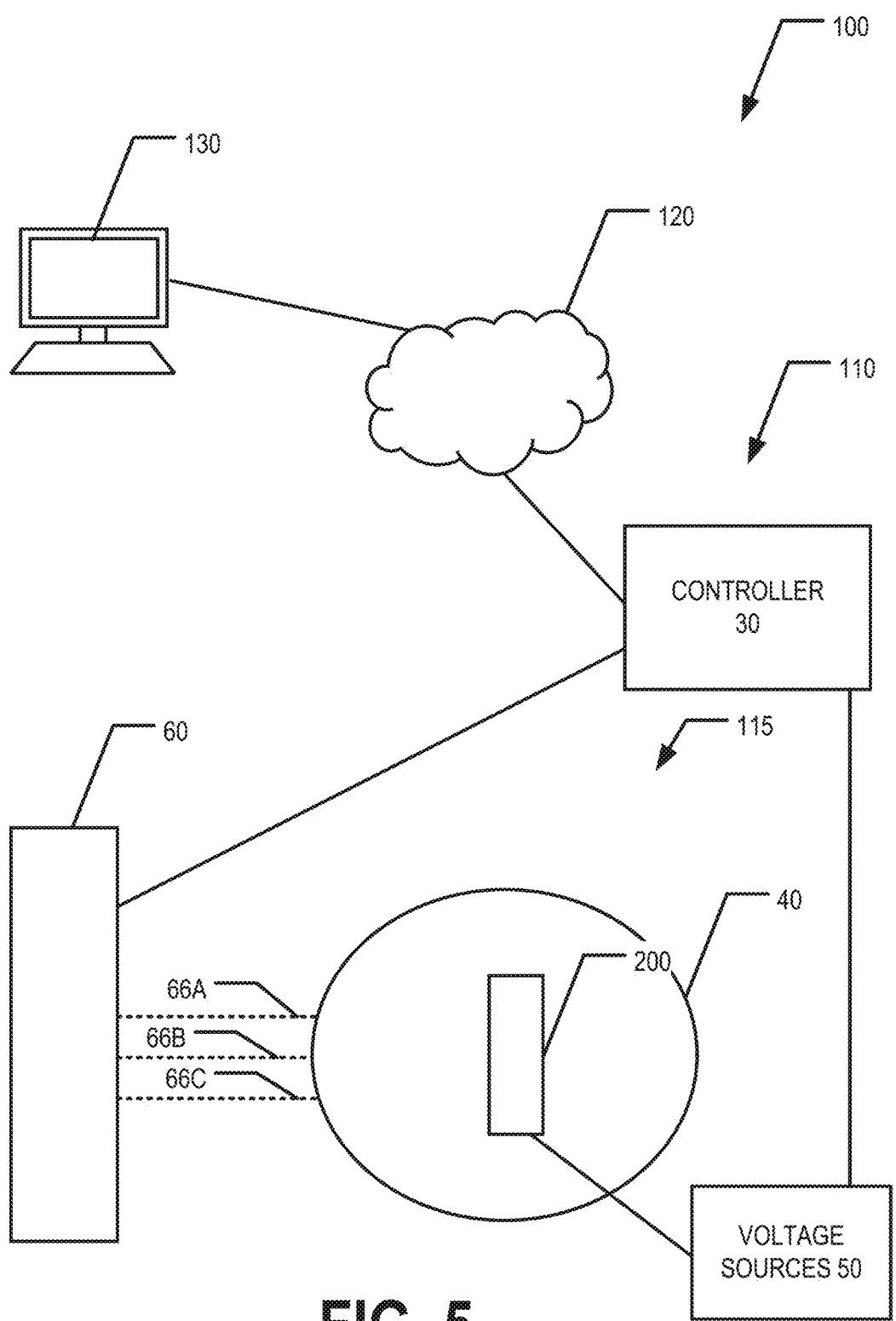
FIG. 5 is a schematic diagram illustrating an example quantum computing system comprising a multi-dimensional atomic object confinement apparatus and configured to transport multi-atomic object crystals through at least one junction of the multi-dimensional atomic object confinement apparatus, according to various embodiments.

In various embodiments, the controlling voltage signals applied to the TT electrodes 235 and the periodic voltage signals applied to the RF rails 230 are controlled by one or more connected devices (e.g., a controller 30 as shown in FIG. 5 and/or the like) via leads. For example, a controller 30 may control a voltage source 50 and/or other voltage driver to cause the voltage source 50 and/or driver to apply controlling voltage signals to the TT electrodes 235 to generate a time-dependent electric potential (e.g., an electric potential that evolves with time) that causes the atomic objects trapped and/or confined by the atomic object confinement apparatus 200 to be transported along prescribed transport paths and/or held at prescribed positions.

Depending on such factors as the charge on the at least one atomic object and/or atomic objects of the multi-atomic object crystal and/or the shape and/or magnitude of the combined electrical and/or magnetic fields (e.g., generated via application of the periodic voltage signals to the RF rails 230 and the controlling voltage signals to the TT electrodes 235), the atomic objects can be stabilized at a particular distance (e.g., approximately 20 µm to approximately 200 µm) above an upper surface of the atomic object confinement apparatus 200 (e.g., the coplanar upper surface of the TT electrodes 235 and RF rails 230). To further contribute to controlling the transit of atomic objects along desired trajectories, the atomic object confinement apparatus 200 may be operated within a cryogenic and/or vacuum chamber capable of cooling the atomic object confinement apparatus to a temperature of less than 124 Kelvin (e.g., less than 100 Kelvin, less than 50 Kelvin, less than 10 Kelvin, less than 5 Kelvin, and/or the like), in various embodiments.

Technical Advantages

Various embodiments provide technical solutions to the technical problem of enabling the performance of (nearly and/or approximately) parallel operations in an atomic object confinement apparatus. For example, in various applications, such as the use an atomic object confinement apparatus as part of a quantum processor and the atomic objects trapped and/or confined by the atomic object confinement apparatus as qubits of the quantum processor, being able to perform (nearly and/or approximately) parallel operations enables the quantum processor to perform deeper quantum circuits and more complex quantum calculations.

For example, the periodic array of legs that includes multiple legs that have the same geometry enables the global transport of atomic objects across the array with a small common set of T electrode control signals shard across corresponding TT electrodes of different legs, with each TT electrode of the same type within a leg manipulated by the same signal as other TT electrodes of the same type of other legs. This enables a substantial reduction of TT electrode manipulation signals, pin-count on the chip comprising the atomic object confinement apparatus, vacuum feedthroughs (e.g., allowing wires to pass through to the interior of the cryogenic and/or vacuum chamber), and control complexity of the atomic object confinement apparatus system.

For example, the curved legs of the periodic or quasi-periodic array of the atomic object confinement apparatus enables manipulation signals emitted along a single beam path to perform operations on multiple atomic objects where the incident manipulation signal propagates substantially parallel to the radio frequency null at some positions along the beam path and substantially perpendicular to the radio frequency null at other positions along the beam path. Therefore, the curved legs of the atomic object confinement apparatus reduce the number of manipulation sources (e.g., lasers) required to perform various operations. Moreover, when an atomic object is located along a beam path but it is desired that a manipulation signal propagating along the beam path is not incident on the atomic object, the atomic object can be transported out of the beam path without the atomic object needing to be transported through a junction, which reduces the time needed for performing such transportation operations and subsequent cooling of the transported atomic object(s).

Additional technical advantages provided by various embodiments may include having operating zones along the shared manipulation signal beam path enables fewer manipulation signals to be needed—reducing power, cost, and complexity. Using shared manipulation signals for parallel operations is already described. In addition to parallel operations, reduced laser power, cost, and complexity are additional benefits which exist even in embodiments where parallel operations are not performed. Another technical advantage provided by various embodiments include the atomic object confinement apparatus having both tangent and perpendicular action regions (e.g., regions where gate operations can be performed) simultaneously along the same beam path enables the reconfiguration of the device to use axial gates or radial gates and/or both as desired. Axial gates may be preferred for various scenarios because of lower noise voltage sources available to TT electrodes relative to the RF rails source. Radial gates may be preferred in various scenarios because of the higher frequency motional modes offered, reducing error and electrical power requirements when the RF rail source noise is sufficiently low. Having an atomic object confinement apparatus with both options enables the reconfiguration of the quantum computer to use the best operating zones in the future if better RF sources become available and to use the axial gates if no such low noise RF source is available.

Thus, various embodiments provide technical advantages over conventional two-dimensional atomic object confinement apparatuses and system comprising such.

Exemplary Quantum Computer Comprising an Atomic Object Confinement Apparatus

As described above, the atomic object confinement apparatus 200 may be part of a quantum processor of a quantum computer. For example, the atomic object trapped and/or confined by the atomic object confinement apparatus 200 may be used as qubits of the quantum processor. The arrangement of the plurality of legs of the atomic object confinement apparatus 200, which includes curved legs, in a periodic or quasi-periodic array enables the efficient performance of parallel operations by the quantum processor. FIG. 5 provides a schematic diagram of an example quantum computer system 100 comprising an atomic object confinement apparatus 200 (e.g., ion trap), in accordance with an example embodiment. In various embodiments, the quantum computer system 100 comprises a computing entity 130 and a quantum computer 110. In various embodiments, the quantum computer 110 comprises a controller 30 and a quantum processor 115. In various embodiments, the quantum processor 115 comprises an atomic object confinement apparatus 200 enclosed in a cryostat and/or vacuum chamber 40, one or more voltage sources 50, one or more manipulation sources 60, and/or the like.

In an example embodiment, the one or more manipulation sources 60 comprise one or more lasers (e.g., optical lasers, microwave sources, and/or the like). In various embodiments, the one or more manipulation sources 60 are configured to manipulate and/or cause a controlled quantum state evolution of one or more atomic objects within the atomic object confinement apparatus 100. For example, in an example embodiment, wherein the one or more manipulation sources 60 comprise one or more lasers, the lasers may provide one or more laser beams to the confinement apparatus within the cryogenic and/or vacuum chamber 40. The laser beams may be used to perform various operations (e.g., parallel operations), such as enacting one or more quantum gates, sympathetic cooling, and/or the like on one or more atomic objects. In various embodiments, the manipulation sources 60 are controlled by respective driver controller elements 615 (see FIG. 6) of the controller 30.

In various embodiments, the quantum computer 110 comprises one or more voltage sources 50. For example, the voltage sources 50 may comprise a plurality of TT voltage drivers and/or voltage sources and/or at least one RF driver and/or voltage source. The voltage sources may be electrically coupled to the corresponding potential generating elements (e.g., TT electrodes 235, RF rails 230) of the atomic object confinement apparatus 200, in an example embodiment. For example, the voltage sources 50 are configured to provide periodic voltage signals to the RF rails 230 and controlling voltage signals to the TT electrodes 235. In various embodiments, the voltages sources 50 are controlled by respective driver controller elements 615 of the controller 30.

In various embodiments, a computing entity 130 is configured to allow a user to provide input to the quantum computer 110 (e.g., via a user interface of the computing entity 130) and receive, view, and/or the like output from the quantum computer 110. The computing entity 130 may be in communication with the controller 30 of the quantum computer 110 via one or more wired or wireless networks 120 and/or via direct wired and/or wireless communications. In an example embodiment, the computing entity 130 may translate, configure, format, and/or the like information/data, quantum circuits, quantum computing algorithms, and/or the like into a computing language, executable instructions, command sets, and/or the like that the controller 30 can understand and/or implement.

In various embodiments, the controller 30 is configured to control the voltage sources cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. In various embodiments, the atomic objects confined within the confinement apparatus are used as qubits of the quantum computer 110. For example, the quantum process 115 may include a plurality of multi-atomic object crystals that each comprise a first atomic object used as a qubit atomic object of the quantum processor and a second atomic object used as a sympathetic cooling atomic object for use in cooling the qubit atomic object of the same multi-atomic object crystal.

Exemplary Controller

In various embodiments, an atomic object confinement apparatus is incorporated into a quantum computer 110. In various embodiments, a quantum computer 110 further comprises a controller 30 configured to control various elements of the quantum computer 110. For example, the controller 30 may be configured to control the voltage sources 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the confinement apparatus.

As shown in FIG. 6, in various embodiments, the controller 30 may comprise various controller elements including processing elements and/or devices 605, memory 610, driver controller elements 615, a communication interface 620, analog-digital converter elements 625, and/or the like.

For example, the processing elements and/or devices 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element and/or device 605 of the controller 30 comprises a clock and/or is in communication with a clock. For example, the processing element and/or device 605 is configured to determine how to cause the quantum processor 115 to perform a quantum circuit using parallel (e.g., simultaneous) operations and then control various aspects of the quantum computer (e.g., by providing instructions to respective driver controller elements 615) to cause the quantum processor 115 to perform the quantum circuit using parallel operations.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), one or more libraries, one or more waveform series and associated meta data, and/or the like. In an example embodiment, execution of at least a portion of the computer program code stored in the memory 610 (e.g., by a processing element and/or device 605) causes the controller 30 to perform one or more steps, operations, processes, procedures and/or the like described herein for tracking the phase, location, and/or the like of an atomic object and/or multi-atomic object crystal within an atomic system and causing the adjustment of the phase of one or more manipulation sources and/or signal(s) generated thereby.

In various embodiments, the driver controller elements 610 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element and/or device 605). In various embodiments, the driver controller elements 615 may enable the controller 30 to operate a manipulation source 60. In various embodiments, the drivers may be laser drivers; vacuum component drivers; drivers for controlling the flow of current and/or voltage applied to TT electrodes, RF rails, and/or other electrodes used for maintaining and/or controlling the trapping potential of the atomic object confinement apparatus and/or causing transport of one or more atomic objects; cryogenic and/or vacuum system component drivers; and/or the like. For example, the drivers may control and/or comprise TT and/or RF voltage drivers and/or voltage sources 50 that provide voltages and/or electrical signals (e.g., periodic voltage signals and/or controlling voltage signals) to the TT electrodes 235 and/or RF rails 230. In various embodiments, the controller 30 comprises means for communicating and/or receiving signals from one or more optical receiver components such as cameras, MEMs cameras, CCD cameras, photodiodes, photomultiplier tubes, and/or the like of an optics collection system configured to capture, detect, measure, and/or the like optical signals generated by atomic objects trapped and/or confined by the atomic object confinement apparatus 200. For example, the controller 30 may comprise one or more analog-digital converter elements 625 configured to receive signals from one or more optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 130 and providing output received from the quantum computer 110 (e.g., from an optical collection system) and/or the result of a processing the output to the computing entity 130. In various embodiments, the computing entity 130 and the controller 30 may communicate via a direct wired and/or wireless connection and/or one or more wired and/or wireless networks 120.

Exemplary Computing Entity

FIG. 7 provides an illustrative schematic representative of an example computing entity 130 that can be used in conjunction with embodiments of the present invention. In various embodiments, a computing entity 130 is configured to allow a user to provide input to the quantum computer 110 (e.g., via a user interface of the computing entity 130) and receive, display, analyze, and/or the like output from the quantum computer 110.

As shown in FIG. 7, a computing entity 10 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 130, and/or the like. In this regard, the computing entity 130 may be capable of operating with one or more air interface standards, communication protocols, modulation types, and access types. For example, the computing entity 130 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 130 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 130 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 130 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 130 can also download changes, add-ons, and updates, for instance, to its firmware, software (e.g., including executable instructions, applications, program modules), and operating system.

The computing entity 130 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 130 to cause display or audible presentation of information/data and for interaction therewith via one or more user input interfaces. The user input interface can comprise any of a number of devices allowing the computing entity 130 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 130 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 130 can collect information/data, user interaction/input, and/or the like.

The computing entity 130 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3

SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 130.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A confinement apparatus comprising:
    a plurality of legs, each leg of the plurality of legs defined by a respective plurality of electrodes and each leg defining a one-dimensional trap segment; and
    a plurality of junctions, each junction of the plurality of junctions connecting at least two legs of the plurality of legs,
    wherein the plurality of legs and the plurality of junctions are arranged into a two-dimensional array of connected one-dimensional trap segments,
    wherein the array of connected one-dimensional trap segments defines a two-dimensional array of atomic object positions arranged in a plurality of columns and a plurality of rows, and
    wherein the plurality of legs is rotated with respect to the two-dimensional array of atomic object positions.

2. The confinement apparatus of claim 1, wherein each junction of the plurality of junctions is disposed such that the junction is non-colinear with each of the plurality of rows and each of the plurality of columns.

3. The confinement apparatus of claim 1, wherein the two-dimensional array of atomic object positions defines, at least in part, one or more beam paths across a dimension of the two-dimensional array of connected one-dimensional trap segments, and each junction of the plurality of junctions is out of alignment with each of the one or more beam paths.

4. The confinement apparatus of claim 3, wherein each leg of the plurality of legs is defined at least in part by a respective radio frequency null, a respective beam path of the one or more beam paths intersects a subset of the plurality of legs, and the subset of the plurality of legs comprises (a) one or more legs where the respective beam path is parallel to the respective radio frequency null at a point of intersection between the respective beam path and a respective leg and (b) one or more legs where the respective beam path is perpendicular to the respective radio frequency null at the point of intersection between the respective beam path and the respective leg.

5. The confinement apparatus of claim 1, wherein the plurality of legs is rotated with respect to the two-dimensional array of atomic object positions by 45 degrees.

6. The confinement apparatus of claim 1, wherein the two-dimensional array of connected one-dimensional array is formed of a plurality of smallest array elements and each of the plurality of smallest array elements is rotated with respect to the two-dimensional array of atomic object positions.

7. The confinement apparatus of claim 1, wherein the two-dimensional array of connected one-dimensional trap segments is a periodic or quasi-periodic array.

8. The confinement apparatus of claim 1, wherein the array of atomic object positions is a periodic or quasi-periodic array.

9. The confinement apparatus of claim 1, wherein the plurality of legs comprises one or more curved legs.

10. The confinement apparatus of claim 9, wherein at least one curved leg of the one or more curved legs has a first end disposed at a first junction and a second end disposed at a second junction and a length of the at least one curved leg is longer than a straight-line distance between the first junction and the second junction.

11. The confinement apparatus of claim 1, wherein the plurality of legs is rotated about a normal of a surface of the confinement apparatus with respect to the two-dimensional array of atomic object positions.

12. The confinement apparatus of claim 1, wherein the array of connected one-dimensional trap segments is configured such that at least one of the following is satisfied:
    a first straight line drawn tangent to a leg of the plurality of legs at a first point is tangent to a first set of additional legs of the plurality of legs at a periodicity or sub-harmonic of the periodicity of the array of connected one-dimensional trap segments and either (a) intersects at a discrete point or (b) does not intersect a remainder of the plurality of legs,
    a second straight line drawn perpendicular to the leg and perpendicular to a second set of additional legs of the plurality of legs at the periodicity or sub-harmonic of the periodicity of the array of connected one-dimensional trap segments,
    a third straight line drawn tangent to a group of legs at the periodicity or sub-harmonic of the periodicity of the array of connected one-dimensional trap segments, the group of legs forming a row or column and the third straight line not intersecting any leg of the group of legs at any other point along the leg,
    a fourth straight line drawn tangent to the leg is not tangent to any other leg of the plurality of legs within a given number of periods of the array of connected one-dimensional trap segments, or
    a fifth straight line drawn perpendicular to the leg at some point is neither (a) tangent to any other leg of the plurality of legs nor (b) perpendicular to a point of another leg of the plurality of legs within a given number of periods of the array of connected one-dimensional trap segments from the leg.

13. A confinement apparatus comprising:
    a plurality of legs, each leg of the plurality of legs defined by a respective plurality of electrodes and each leg defining a one-dimensional trap segment; and
    a plurality of junctions, each junction of the plurality of junctions connecting at least two legs of the plurality of legs,
    wherein the plurality of legs and the plurality of junctions are arranged into a two-dimensional array of connected one-dimensional trap segments,
    wherein the array of connected one-dimensional trap segments defines a two-dimensional array of atomic object positions arranged in a plurality of columns and a plurality of rows, and wherein each junction of the plurality of junctions is disposed such that the junction is non-colinear with each of the plurality of rows and each of the plurality of columns.

14. A quantum computer comprising:
a controller comprising at least one processor and non-transitory computer-readable memory, the controller configured to cause one or more voltage signals to be applied to respective electrodes of a confinement apparatus; and
the confinement apparatus, wherein the confinement apparatus comprises:
a plurality of legs, each leg of the plurality of legs defined by a respective plurality of electrodes and each leg defining a one-dimensional trap segment; and
a plurality of junctions, each junction of the plurality of junctions connecting at least two legs of the plurality of legs,
wherein the plurality of legs and the plurality of junctions are arranged into a two-dimensional array of connected one-dimensional trap segments,
wherein the array of connected one-dimensional trap segments defines a two-dimensional array of atomic object positions arranged in a plurality of columns and a plurality of rows, and
wherein the plurality of legs is rotated with respect to the two-dimensional array of atomic object positions.

15. The quantum computer of claim 14, wherein the two-dimensional array of atomic object positions defines, at least in part, one or more beam paths across a dimension of the two-dimensional array of connected one-dimensional trap segments, and each junction of the plurality of junctions is out of alignment with each of the one or more beam paths.

16. The quantum computer of claim 15, further comprising one or more manipulation sources, the one or more manipulation sources comprising at least one of a laser or a microwave source, wherein the controller is configured to control operation of the one or more manipulation sources to cause the one or more manipulation sources generate one or more manipulation signals and to cause the one or more manipulation signals to be propagated along the one or more beam paths.

17. The quantum computer of claim 16, wherein the one or more manipulation signals comprise one or more of a laser beam, a microwave signal, or a magnetic field and the one or more manipulation signals are configured to perform parallel operations at respective object positions of the two-dimensional array of atomic object positions.

18. The quantum computer of claim 14, wherein the two-dimensional array of connected one-dimensional trap segments is a periodic or quasi-periodic array.

19. The quantum computer of claim 14, wherein the array of atomic object positions is a periodic or quasi-periodic array.

20. The quantum computer of claim 14, wherein the plurality of legs comprises one or more curved legs.

* * * * *